United States Patent [19]

Duffy et al.

[11] Patent Number: 5,382,602

[45] Date of Patent: Jan. 17, 1995

US005382602A

[54] FLEXIBLE SLABSTOCK POLYURETHANE FOAM FORMULATION FOR A RAPID-COOL PROCESS

[76] Inventors: Robert D. Duffy, 7 Ardrossan Ave., West Chester, Pa. 19382; George Combs, 1534 Jackson St., Charleston, W. Va. 25311

[21] Appl. No.: 73,839

[22] Filed: Jun. 9, 1993

[51] Int. Cl.⁶ ............................................. C08G 18/16
[52] U.S. Cl. .................................. 521/55; 521/99; 521/126; 521/129; 521/172; 521/174; 521/176
[58] Field of Search .............. 521/126, 129, 172, 174, 521/176, 55, 99

[56] References Cited

U.S. PATENT DOCUMENTS

| | | | |
|---|---|---|---|
| 3,890,414 | 6/1975 | Ricciardi et al. | 264/45.1 |
| 4,080,343 | 3/1978 | Raden | 521/129 |
| 4,255,528 | 3/1981 | Raden | 521/129 |
| 4,950,694 | 8/1990 | Hager | 521/167 |
| 5,128,379 | 7/1992 | Stone | 521/50 |
| 5,171,756 | 12/1952 | Ricciardi et al. | 521/55 |
| 5,188,792 | 2/1993 | Drye et al. | 264/232 |

Primary Examiner—Maurice J. Welsh
Assistant Examiner—Shelley A. Dodson

[57] ABSTRACT

Flexible, slabstock polyurethane foam compositions useful for a rapid-cool process are disclosed. The foams are produced in the presence of a tetravalent tin catalyst, preferably at a relatively low isocyanate index, and preferably with a polyol that contains a non-volatile inhibitor. The foams of the invention eliminate or greatly reduce the amount of visible smoke produced in a rapid-cool process.

13 Claims, No Drawings

FLEXIBLE SLABSTOCK POLYURETHANE FOAM FORMULATION FOR A RAPID-COOL PROCESS

FIELD OF THE INVENTION

The invention relates to polyurethane foams and a process for producing them. In particular, the invention is a polyurethane foam that produces a reduced amount of visible smoke when the freshly made foam is subjected to a rapid-cool process.

BACKGROUND OF THE INVENTION

Flexible, slabstock polyurethane foam is an open-celled, porous foam that is widely used in furniture, mattresses, carpet underlay, and many other applications for which cushioning is desired. The polymerization reaction to make polyurethane foam is exothermic, and much of the heat generated in the reaction is trapped within the foam, which is a good insulator. Foams are typically left to cool and cure for hours, or even days, to allow them to stabilize. Unfortunately, even foams that are allowed to cure slowly at ambient temperature do not usually develop uniform physical properties throughout the foam, largely because of the vast temperature gradient that develops across the foam during and after polymerization.

To overcome some of the problems of uneven curing of polyurethane foams, Ricciardi et al. (U.S. Pat. No. 3,890,414) developed a rapid-cool process in which a freshly polymerized polyurethane foam bun is uniformly cooled by passing a large quantity of a cooling gas through the foam mass, preferably by applying a vacuum to one surface of the foam bun. This process is also known as "forced-air cooling."

The rapid-cool process described in U.S. Pat. No. 3,890,414 reduces the amount of time required for cooling foams, and gives products with more uniform physical properties. A drawback of the rapid-cool process is that the cooling gas initially exhausted from the foam contains particulate matter as is evidenced by a visible smoke plume. When large foam buns are produced, a substantial amount of smoke is exhausted to the atmosphere, and this smoke is a concern to slab foam producers.

Recent patents describe newer approaches to post-treating freshly made flexible polyurethane foams. U.S. Pat. No. 5,188,792, for example, teaches to post-treat a polyurethane foam by recirculating reactant-laden air through a foam block that has been slit along opposing faces.

U.S. Pat. No. 5,171,756 teaches a three-stage cooling process. In stage one, cooled air is drawn through the foam and is then exhausted to the atmosphere. The reference suggests that the exhausted air contains excess water, BHT, and a minor proportion of TDI ureas. This air is exhausted to the atmosphere to prevent BHT and TDI ureas from clogging heat exchangers. In stage two, sublimates are withdrawn from the foam with air that is subsequently cooled to condense the sublimates, and is then recirculated through the foam to redeposit the sublimates uniformly throughout the foam. In stage three, additional cool air is drawn through the bun and is vented to the atmosphere to remove moisture and volatile components.

Unfortunately, when cooling air is exhausted to the atmosphere during stage one of the process of U.S. Pat. No. 5,171,756, a visible smoke plume is still evident. Thus, although rapid-cool technology that permits more uniform curing and cooling of polyurethane foams is available, the problem of eliminating visible smoke generated during at least the initial stage of the rapid-cool process remains.

SUMMARY OF THE INVENTION

We have discovered that the smoke plume generated in the early stages of a rapid-cool process is derived from substantial proportions of both BHT and TDI ureas. Based on this discovery, we have developed flexible, slabstock polyurethane foam formulations that can be used in a rapid-cool process that greatly reduce or even eliminate the smoke produced during the process.

The flexible polyurethane foam of the invention is suitable for use in a rapid-cool process. The foam is prepared by reacting a polyether polyol, toluene diisocyanate, and water in the presence of a surfactant, an amine catalyst, and a tetravalent tin catalyst. The freshly prepared foam produces a reduced amount of visible smoke during a rapid-cool process compared with a freshly prepared conventional flexible slabstock foam, which is typically not prepared with a tetravalent tin catalyst. When a polyol that contains a non-volatile inhibitor is used to make the foam, the visible smoke plume can be practically eliminated.

The foam formulations of the invention allow, for the first time, polyurethane foams to be made and rapidly cooled without generating a substantial smoke plume containing TDI ureas that is either vented to the atmosphere, or if it is recirculated, tends to clog heat exchangers.

DETAILED DESCRIPTION OF THE INVENTION

The polyurethane foams of the invention are produced by reacting a polyether polyol with toluene diisocyanate and water in the presence of a surfactant, an amine catalyst, and a tetravalent tin catalyst.

Polyether polyols useful in the invention are those known in the art to be useful for producing flexible, slabstock polyurethane foam. Suitable polyether polyols include polyoxyalkylene polyols such as polyoxypropylene polyols and polytetramethylene ether glycols. Polyoxyalkylene polyols having average hydroxyl functionalities from about 2 to about 8 are suitable. Preferred polyols are those derived from propylene oxide, ethylene oxide, or mixtures thereof, that have average hydroxyl functionalities from about 2 to about 3. Suitable polyether polyols will have number average molecular weights within the range of about 500 to about 20,000, preferably within the range of about 1,000 to about 10,000, and more preferably within the range of about 2,000 to about 5,000. Examples of suitable polyols are ARCOL F-3020 polyether triol (product of ARCO Chemical Company) and VORANOL 3010 polyol (product of Dow Chemical Company), which are commonly used polyether polyols for manufacturing flexible, slabstock polyurethane foams.

Polyether polyols are commonly stabilized with free-radical inhibitors. The most widely used inhibitor is BHT (2,6-di-tert-butyl-4-methylphenol), a relatively volatile organic compound that can sublime at the elevated temperatures present within a freshly produced polyurethane foam. BHT, which is a solid at room temperature and atmospheric pressure, will sublime into the vapor phase and be removed from a foam when air is passed through a freshly made foam during a rapid-cool process. To some extent, the presence of BHT in the vapor will contribute to an increased amount of smoke. Although polyols with any free-radical inhibitor-including polyols that contain BHT-can be used to make the polyurethane foams of the invention, preferred polyols will contain no BHT. Preferred polyols will contain relatively non-volatile inhibitors that will not vaporize during the rapid-cool process. Smoke generated during the rapid-cool process is minimized or even eliminated when a polyol containing a non-volatile inhibitor is used in the polyurethane foam formulations of the invention.

As defined in this patent application, a "non-volatile inhibitor" is a free-radical inhibitor that is substantially less volatile than BHT, and tends substantially to remain within a polyurethane foam during a rapid-cool process rather than to escape into the vapor phase like BHT. The volatility of a particular inhibitor relative to BHT can be readily determined by any convenient method known to those skilled in the art, including, for example, thermogravimetric analysis.

Suitable non-volatile inhibitors include alkylated phenols and bisphenols; alkylidene bis-, tris-, and polyphenols; thio and dithio bis-, tris-, and polyalkylated phenols; phenol condensation products; amines; esters; organic phosphites (including phenolic phosphites) and phosphates; and the like, and mixtures thereof. Suitable non-volatile inhibitors are available from Uniroyal Chemical under the NAUGUARD trademark, such as, for example, NAUGUARD XL-1, NAUGUARD 115, NAUGUARD 10, NAUGUARD 492, and NAUGUARD 76 inhibitors, from Ciba-Geigy under the IRGANOX trademark, such as, for example IRGANOX 1035 and IRGANOX 1096 inhibitors, and from R. T. Vanderbilt Co. under the VANOX trademark, such as, for example, VANOX 926 and VANOX 927 inhibitors.

Toluene diisocyanate (TDI) is used to make the polyurethane foams of the invention. An 80:20 mixture of 2,4- and 2,6- isomers is readily available and is preferred for use, although mixtures containing more or less of one isomer can be used, and pure 2,4- or 2,6-TDI can be used. A 65:35 mixture of 2,4- and 2,6-isomers, which is commercially available in some areas, is also suitable for use. Mixtures of TDI and minor amounts of other polyisocyanates are also suitable for use in making the polyurethanes of the invention. Thus, a minor proportion of diphenylmethane-4,4'-diisocyanate (MDI), carbodiimide-modified MDIs, polymeric MDIs, hydrogenated MDIs, or the like, can be included if desired.

Water is included in the formulations. Water reacts with isocyanate groups to produce carbon dioxide, which functions as a blowing agent for the foams. Other auxiliary blowing agents such as hydrocarbons, halogenated hydrocarbons, fluorocarbons, or the like, can also be used, although it is preferred to use water as the sole blowing agent.

The polyurethane foams of the invention produce reduced amounts of visible smoke from a rapid-cool process over a wide range of isocyanate indices. The foams can be made at isocyanate indices within the range of about 95 to about 110. The amount of smoke will be minimized or even eliminated when a relatively low isocyanate index is used. Thus, a preferred range is from about 98 to about 102. At relatively high isocyanate indices, excess TDI may be present, and more smoke will result.

A tetravalent tin catalyst is used to make the flexible polyurethane foams of the invention. Preferred tetravalent tin catalysts are mono-, di-, and trialkyltin esters, thioesters, mercaptides, and hydroxyalkylmercaptides. Because they are commercially available, dialkyltin esters, thioesters, and mercaptides are generally preferred. Suitable tetravalent tin catalysts include, but are not limited to, dibutyltin dilaurate, dibutyltin didecanoate, tributyltin laurate, dimethyltin dilaurate, butyltin triacetate, dibutyltin thioesters, dibutyltin mercaptides, dimethyltin bis(2-hydroxyethylmercaptide), dimethyltin bis(2-ethylhexanoate), dibutyltin stearate, dibutyltin maleate, dibutyltin bis(2-mercaptoethyl dodecanoate), dipropyltin didecanoate, and the like, and mixtures thereof. Dialkyltin diesters such as dibutyltin dilaurate are particularly preferred. Suitable tetravalent tin catalysts include those available from Witco under the FOAMREZ trademark, such as FOAMREZ SUL-4 catalyst (dibutyltin dilaurate), FOAMREZ UL-1 catalyst (dibutyltin mercaptide), and FOAMREZ UL-29 catalyst (dioctyltin thioester).

Divalent tin catalysts such as stannous octoate are more commonly used than tetravalent tin catalysts for making flexible slabstock polyurethane foam, mainly because over-catalysis and foam decomposition can occur when a tetravalent tin catalyst is used. Tetravalent tin catalysts have been more widely used in cold-molding foam applications, high-resilience foams, and in non-foam urethanes. Surprisingly, a tetravalent tin catalyst is needed for the compositions of the invention, while divalent tin catalysts are not suitable. When a divalent tin catalyst is used, substantially more smoke is generated in the rapid-cool process. Thus, the combined use of a tetravalent tin catalyst and a low isocyanate index gives foams that produce little or no smoke in a rapid-cool process. The effect is further enhanced by using a polyol that contains a non-volatile inhibitor.

If desired, a small amount of an acid or acid-generating compound such as an acid chloride can be included in the formulation for the purpose of deactivating the tetravalent tin catalyst at the end of the polymerization to help prevent decomposition of the foam. Suitable compounds for this purpose include, for example, tartaric acid, 2-chloroethylphosphonic acid, hydrochloric acid, acetic acid, acetyl chloride, and the like, and mixtures thereof.

Other conventional components commonly used to make polyurethane foams and well known to those skilled in the art can be included in the formulations of the invention: for example, amine catalysts, surfactants, additives, fillers, flame retardants, and the like can be used. Generally, an amine catalyst and a surfactant will be needed, while the other components are optionally included as desired.

The invention includes a process for reducing the amount of smoke produced from a flexible, slabstock polyurethane foam during a rapid-cool process. The process comprises: (a) preparing the foam from a polyether polyol, toluene diisocyanate, and water in the presence of a surfactant, an amine catalyst, and a tetravalent tin catalyst; and (b) rapidly cooling the freshly prepared foam by passing a cooling gas through the foam. The cooling gas can be any reasonably inert gas, such as air, argon, nitrogen, carbon dioxide, or the like. Air is a preferred cooling gas.

The amount of visible smoke produced from the foam during the rapid-cool process is substantially reduced or eliminated compared with the amount of smoke produced from a conventional flexible slabstock polyurethane foam, which is ordinarily prepared in the absence of a tetravalent tin catalyst. The foams are prepared using any of a number of well-known methods, including the one-shot method and the prepolymer method. The one-shot method is generally preferred. Any of the known methods for rapidly cooling freshly prepared polyurethane foams, including the methods described in U.S. Pat. Nos. 5,171,756, 5,128,379, 5,188,792, and 3,890,414 can be used. The teachings of these references are incorporated by reference herein in their entirety.

The following examples merely illustrate the invention. Those skilled in the art will recognize numerous variations that are within the spirit of the invention and scope of the claims.

EXAMPLE 1

A flexible, slabstock polyurethane foam is prepared by reacting a polyether triol (ARCOL F-3020 polyol, product of ARCO Chemical Company) (100 parts by weight), toluene diisocyanate (80:20 mixture of 2,4- and 2,6- isomers) (61.9 parts), and water (5.5 parts) in the presence of a silicone surfactant (1.0 part), triethylenediamine (amine catalyst, 0.1 part), and dibutyltin dilaurate (0.2 parts). The polyol contains a non-volatile inhibitor, i.e., one that is less volatile than BHT. The foam is prepared by the usual one-shot method as is well known in the art. The isocyanate index is 100.

Immediately following preparation, the box foam (15"×15"×24") is cut on two opposite sides, and suction is applied to one of the cut surfaces to draw air through the bun. The exhaust is visually monitored to measure the amount of smoke evolved from the foam. On a scale of 0–10, with 0 being no smoke, and 10 being very smoky, the foam of Example 1 rates 0 (no smoke observed).

EXAMPLE 2

The procedure of Example 1 is repeated, except that VORANOL 3010 polyol (product of Dow Chemical Company), a polyether polyol that contains about 4000 ppm of BHT as an inhibitor is used instead of the ARCOL F-3020 polyol that contains a non-volatile inhibitor. The resulting polyurethane foam rates 3–4 on the smoke scale.

EXAMPLE 3

The procedure of Example 1 is repeated, except that the foam is made at a 108 isocyanate index. The resulting polyurethane foam rates 4 on the smoke scale.

COMPARATIVE EXAMPLE 4

The procedure of Example 1 is repeated, except that the foam is made at a 108 isocyanate index, and stannous octoate (a divalent tin catalyst) is used in place of dibutyltin dilaurate (a tetravalent tin catalyst). The resulting polyurethane foam rates 8 on the smoke scale.

COMPARATIVE EXAMPLE 5

The procedure of Example 1 is repeated, except that the foam is made at a 108 isocyanate index, stannous octoate is used in place of dibutyltin dilaurate, and the amine catalyst is omitted. The resulting polyurethane foam rates 10 on the smoke scale.

COMPARATIVE EXAMPLE 6

The procedure of Example 1 is followed, except that the foam is made at a 108 isocyanate index, and the amine catalyst is omitted. The resulting polyurethane foam rates 6 on the smoke scale.

The preceding examples demonstrate that smoke generated in a rapid-cool process is reduced substantially by preparing the foam at a relatively low isocyanate index while using a tetravalent tin catalyst. Smoke can be practically eliminated when a tetravalent tin catalyst, a low isocyanate index, and a polyol that contains a non-volatile inhibitor are used.

The examples are meant only as illustrations. The invention is defined by the following claims.

We claim:

1. A process for reducing the amount of smoke produced from a flexible slabstock polyurethane foam during a rapid-cool process, said process comprising:
   (a) preparing the foam from a polyether polyol, toluene diisocyanate, and water in the presence of a surfactant, an amine catalyst, and a tetravalent tin catalyst; and
   (b) rapidly cooling the freshly prepared foam by passing a cooling gas through the foam;
   wherein the amount of visible smoke produced from the foam during the rapid-cool process is substantially reduced or eliminated compared with the amount of smoke produced from a conventional flexible slabstock polyurethane foam, which is prepared in the absence of a tetravalent tin catalyst.

2. The process of claim 1 wherein the polyol contains a non-volatile inhibitor.

3. The process of claim 2 wherein the non-volatile inhibitor is selected from the group consisting of alkylated phenols and bisphenols; alkylidene bis-, tris-, and polyphenols; thio and dithio bis-, tris-, and polyalkylated phenols; phenol condensation products; amines; esters; organic phosphites and phosphates; and mixtures thereof.

4. The process of claim 1 wherein the tetravalent tin catalyst is selected from the group consisting of mono-, di-, and trialkyltin esters, thioesters, mercaptides, and hydroxyalkylmercaptides.

5. The process of claim 1 wherein the tetravalent tin catalyst is a dialkyltin diester.

6. The process of claim 1 wherein the tetravalent tin catalyst is dibutyltin dilaurate.

7. The process of claim 1 wherein the isocyanate index is within the range of about 95 to about 110.

8. The process of claim 1 wherein the isocyanate index is within the range of about 98 to about 102.

9. The process of claim 1 wherein the amount of visible smoke produced from the foam during the rapid-cool process is reduced by at least about 50% compared with the amount of smoke produced from a conventional flexible slabstock polyurethane foam, which is prepared in the absence of a tetravalent tin catalyst.

10. The process of claim 1 wherein the cooling gas is air.

11. A process for reducing the amount of smoke produced from a flexible slabstock polyurethane foam during a rapid-cool process, said process comprising:
    (a) preparing the foam from a polyether polyol, said polyol containing a non-volatile inhibitor, toluene diisocyanate, and water in the presence of a surfactant, an amine catalyst, and a tetravalent tin catalyst at an isocyanate index within the range of about 98 to about 102; and
    (b) rapidly cooling the freshly prepared foam by passing air through the foam;

wherein the amount of visible smoke produced from the foam during the rapid-cool process is reduced by at least about 50% compared with the amount of smoke produced from a conventional flexible slabstock polyurethane foam, which is prepared in the absence of a tetravalent tin catalyst.

12. The process of claim 11 wherein the tetravalent tin catalyst is selected from the group consisting of mono-, di-, and trialkyltin esters, thioesters, mercaptides, and hydroxyalkylmercaptides.

13. The process of claim 11 wherein the non-volatile initiator is selected from the group consisting of alkylated phenols and bisphenols; alkylidene bis-, tris-, and polyphenols; thio and dithio bis-, tris-, and polyalkylated phenols; phenol condensation products; amines; esters; organic phosphites and phosphates; and mixtures thereof.

* * * * *